(12) United States Patent
Chen

(10) Patent No.: US 12,034,389 B2
(45) Date of Patent: Jul. 9, 2024

(54) BRUSHLESS DC MOTOR CONTROL SYSTEM FOR CEILING FAN

(71) Applicant: AIR COOL INDUSTRIAL CO., LTD., Taichung (TW)

(72) Inventor: Shih-Ming Chen, Taichung (TW)

(73) Assignee: AIR COOL INDUSTRIAL CO., LTD., Taichung (TW)

( * ) Notice: Subject to any disclaimer, the term of this patent is extended or adjusted under 35 U.S.C. 154(b) by 341 days.

(21) Appl. No.: 17/672,423

(22) Filed: Feb. 15, 2022

(65) Prior Publication Data

US 2023/0258194 A1    Aug. 17, 2023

(51) Int. Cl.

| H02P 25/03 | (2016.01) |
|---|---|
| F04D 25/06 | (2006.01) |
| H02P 6/30 | (2016.01) |
| H02P 23/14 | (2006.01) |

(52) U.S. Cl.
CPC .............. *H02P 25/03* (2016.02); *F04D 25/06* (2013.01); *H02P 23/14* (2013.01)

(58) Field of Classification Search
CPC .. H02P 25/03; H02P 23/14; H02P 6/30; F04D 25/06; F04D 25/088; F04D 27/004; F04D 19/005
See application file for complete search history.

(56) References Cited

U.S. PATENT DOCUMENTS

| 9,048,769 | B2 * | 6/2015 | Ohgushi | H02P 6/182 |
|---|---|---|---|---|
| 10,469,001 | B1 * | 11/2019 | Liao | F04D 27/004 |
| 11,309,821 | B2 * | 4/2022 | Chen | H02P 27/04 |
| 11,686,317 | B2 * | 6/2023 | Chen | H02P 1/44 |
| | | | | 318/400.26 |
| 2008/0218108 | A1 * | 9/2008 | Niikura | H02P 6/08 |
| | | | | 318/400.3 |

* cited by examiner

*Primary Examiner* — Thai T Dinh
(74) *Attorney, Agent, or Firm* — Sinorica International

(57) ABSTRACT

A brushless DC motor control system for a ceiling fan is electrically connected to a brushless DC motor, and includes a first switch, a detection module, a timer, a processing module, and a driving module. The first switch sends a first switch signal to the detection module for detection. The detection module outputs an operating electric potential detection signal to the timer. The timer outputs an operating electric potential timing signal to the processing module, so that the processing module outputs a first control signal and a second control signal to the driving module for controlling the brushless DC motor to change the rotational speed and the rotational direction respectively, increasing the convenience of use.

10 Claims, 3 Drawing Sheets

BRUSHLESS DC MOTOR CONTROL SYSTEM FOR CEILING FAN

FIELD OF THE INVENTION

The present invention relates to a brushless DC motor, and more particularly, to a brushless DC motor control system for a ceiling fan.

BACKGROUND OF THE INVENTION

In general, ceiling fan devices may include a hand-pull switch or a wall control switch. Taking a ceiling fan device having a wall control switch as an example, the user controls the rotational speed of the ceiling fan by turning the wall control switch mounted on the wall to drive a mechanical speed change device inside the ceiling fan.

However, the user has to turn the wall control switch every time he/she wants to adjust the rotational speed of the ceiling fan and knows the rotational speed of the ceiling fan through the number corresponding to the rotational speed displayed on the wall control switch. If in a dim environment without light, it is impossible to accurately know the current rotational speed of the ceiling fan. It is inconvenient to operate to ceiling fan. Accordingly, the inventor of the present invention has devoted himself based on his many years of practical experiences to solve these problems.

SUMMARY OF THE INVENTION

The primary object of the present invention is to provide a brushless DC motor control system for a ceiling fan, which can control the brushless DC motor to change the rotational speed and the rotational direction through two different electric potential duration intervals, thereby increasing the convenience in use.

In order to achieve the aforesaid object, a brushless DC motor control system for a ceiling fan is provided. The brushless DC motor control system is electrically connected to a brushless DC motor. The brushless DC motor control system comprises a first switch, a detection module, a timer, a processing module, and a driving module. The first switch has a first switch signal. When the first switch is not actuated, an electric potential of the first switch signal is a normal electric potential; when the first switch is actuated, the electric potential of the first switch signal is an operating electric potential. The detection module includes an operating electric potential detection unit. The operating electric potential detection unit is electrically connected to the first switch. The operating electric potential detection unit is configured to receive the first switch signal and detect the operating electric potential of the first switch signal to output an operating electric potential detection signal. The timer is electrically connected to the operating electric potential detection unit. The timer is configured to receive the operating electric potential detection signal and calculate a duration of the operating electric potential each time to output an operating electric potential timing signal. The processing module is electrically connected to the timer. The processing module is configured to receive the operating electric potential timing signal. The processing module is preset with a first operating electric potential duration interval and a second operating electric potential duration interval. The first operating electric potential duration interval and the second operating electric potential duration interval are not overlapped with each other. The processing module outputs a first control signal according to a calculation result of the duration of the operating electric potential and the first operating electric potential duration interval each time. The processing module outputs a second control signal according to a calculation result of the duration of the operating electric potential and the second operating electric potential duration interval each time. The driving module is electrically connected to the processing module and the brushless DC motor. The driving module is configured to receive the first control signal and the second control signal. The driving module controls the brushless DC motor to change a rotational speed according to the first control signal. The driving module controls the brushless DC motor to change a rotational direction according to the second control signal.

In the brushless DC motor control system provided by the present invention, the first switch signal is sent to the operating electric potential detection unit for detection. The operating electric potential detection unit receives the first switch signal and detects the operating electric potential of the first switch signal, and then outputs the operating electric potential detection signal to the timer. The timer receives the operating electric potential detection signal and calculates the duration of the operating electric potential each time, and outputs the operating electric potential timing signal to the processing module. The processing module receives the operating electric potential timing signal and outputs the first control signal to the driving module according to the calculation result of the duration of the operating electric potential and the first operating electric potential duration interval each time. The processing module outputs the second control signal to the driving module according to the calculation result of the duration of the operating electric potential and the second operating electric potential duration interval each time. The driving module controls the brushless DC motor to change the rotational speed according to the first control signal, and the driving module controls the brushless DC motor to change the rotational direction according to the second control signal. This further increases the convenience of use.

DETAILED DESCRIPTION OF THE PREFERRED EMBODIMENTS

Embodiments of the present invention will now be described, by way of example only, with reference to the accompanying drawings.

Figure 1:
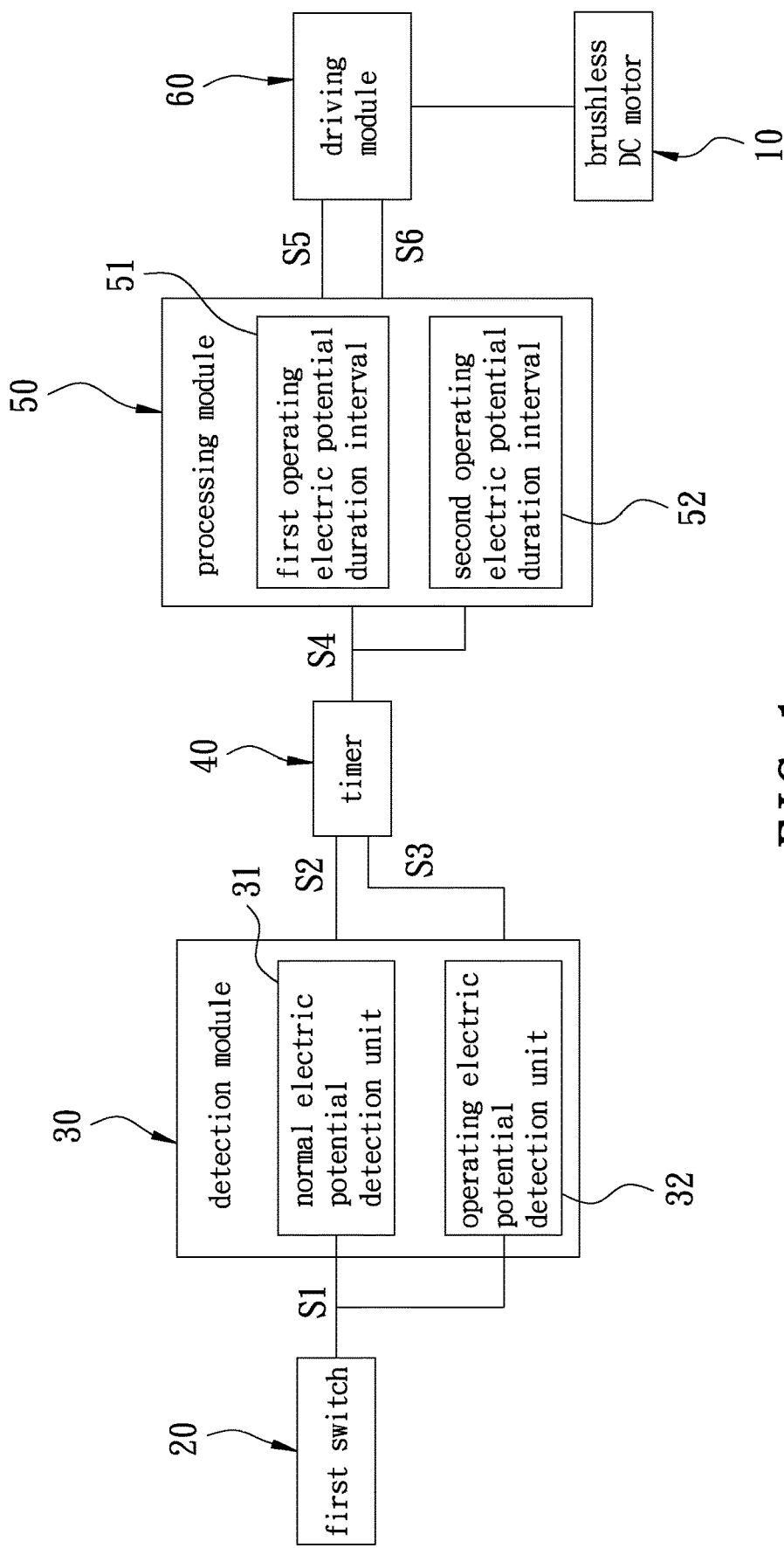
FIG. 1 is a block diagram according to a preferred embodiment of the present invention.
Figure 2:
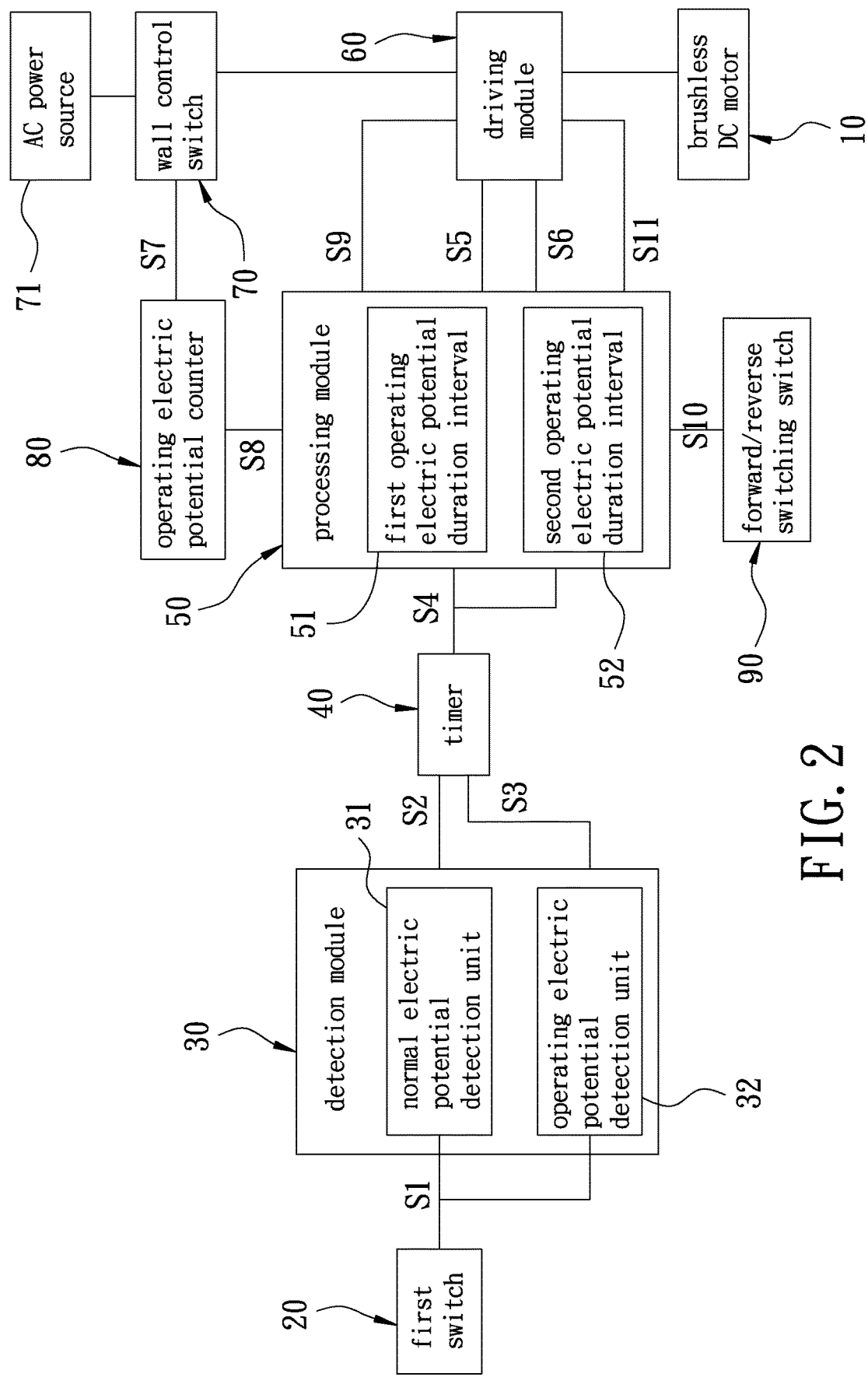
FIG. 2 is another block diagram according to a preferred embodiment of the present invention.

FIG. 1 and FIG. 2 are block diagrams according to a preferred embodiment of the present invention. The present invention discloses a brushless DC motor control system for a ceiling fan. The brushless DC motor control system is electrically connected to a brushless DC motor 10. The brushless DC motor control system comprises a first switch 20, a detection module 30, a timer 40, a processing module 50, a driving module 60, a wall control switch 70, an operating electric potential counter 80, and a forward/reverse switching switch 90.

Figure 3:
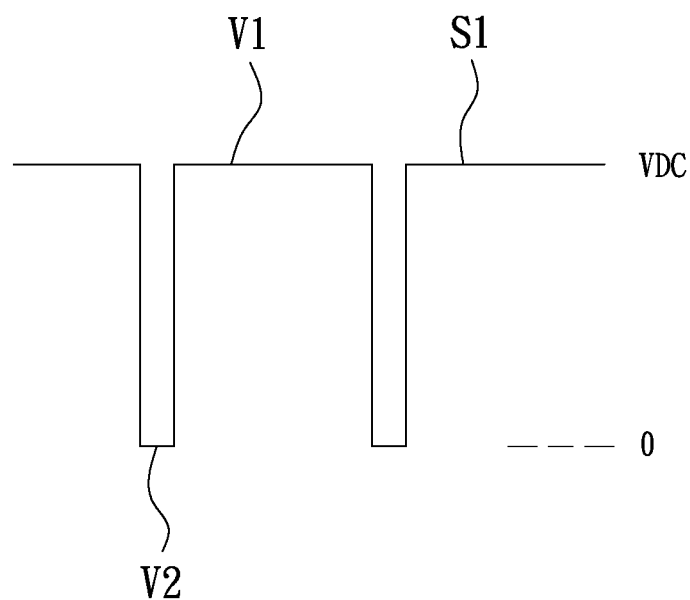
FIG. 3 is a schematic diagram of the waveform of the first switch signal of the present invention, taking a normally open pull switch as an example.
Figure 4:
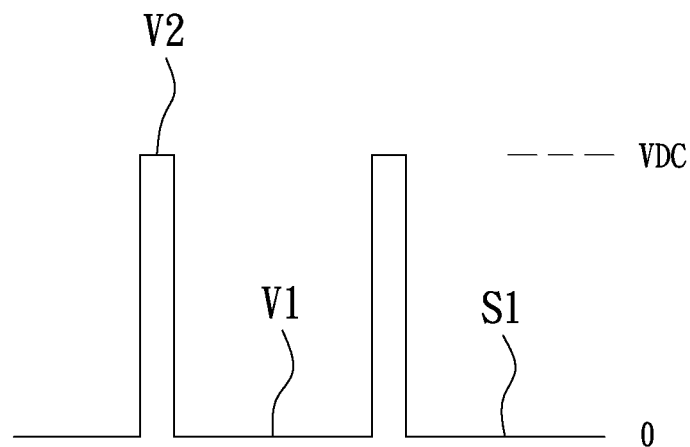
FIG. 4 is a schematic diagram of the waveform of the first switch signal of the present invention, taking a normally closed pull switch as an example.

FIG. 3 is a schematic diagram of the waveform of the first switch signal of the present invention, taking a normally open pull switch as an example. FIG. 4 is a schematic diagram of the waveform of the first switch signal of the present invention, taking a normally closed pull switch as an example. The first switch 20 may be a normally closed pull switch or a normally open pull switch. The first switch 20 has a first switch signal S1. The first switch signal S1 is a digital signal. When the first switch 20 is not actuated, the electric potential of the first switch signal S1 is a normal electric potential V1. When the first switch 20 is actuated, the electric potential of the first switch signal S1 is an operating electric potential V2.

The detection module 30 includes a normal electric potential detection unit 31 and an operating electric potential detection unit 32. The normal electric potential detection unit 31 is electrically connected to the first switch 20. The normal electric potential detection unit 31 is configured to receive the first switch signal S1 and detect the normal electric potential V1 of the first switch signal S1 to output a normal electric potential detection signal S2. The operating electric potential detection unit 32 is electrically connected to the first switch 20. The operating electric potential detection unit 32 is configured to receive the first switch signal S1 and detect the operating electric potential V2 of the first switch signal S1 to output an operating electric potential detection signal S3.

The timer 40 is electrically connected to the normal electric potential detection unit 31 and the operating electric potential detection unit 32. The timer 40 is configured to receive the normal electric potential detection signal S2 and the operating electric potential detection signal S3 and calculate the duration of the operating electric potential V2 each time to output an operating electric potential timing signal S4.

The processing module 50 is a microcontroller unit (MCU). The processing module 50 is electrically connected to the timer 40. The processing module 50 is configured to receive the operating electric potential timing signal S4. The processing module 50 is preset with a first operating electric potential duration interval 51 and a second operating electric potential duration interval 52. The first operating electric potential duration interval 51 and the second operating electric potential duration interval 52 do not overlap each other. The processing module 50 outputs a first control signal S5 according to the calculation result of the duration of the operating electric potential V2 and the first operating electric potential duration interval 51 each time. The processing module 50 outputs a second control signal S6 according to the calculation result of the duration of the operating electric potential V2 and the second operating electric potential duration interval 52 each time.

The driving module 60 is electrically connected to the processing module 50 and the brushless DC motor 10. The driving module 60 is configured to receive the first control signal S5 and the second control signal S6. The driving module 60 controls the brushless DC motor 10 to change the rotational speed according to the first control signal S5. The driving module 60 controls the brushless DC motor 10 to change the rotational direction according to the second control signal S6. In this embodiment, the driving module 60 further controls the brushless DC motor 10 to start, stop and change the rotational speed according to the first control signal S5.

The wall control switch 70 is electrically connected to an AC power source 71 and the driving module 60. The AC power source 71 may be a mains electricity power source or a wall power source. The wall control switch 70 outputs a wall control switch signal S7.

The operating electric potential counter 80 is electrically connected to the wall control switch 70 and the processing module 50. The operating electric potential counter 80 is configured to receive the wall control switch signal S7 and count the operating frequency of the wall control switch 70 to output an operating frequency detection signal S8. The processing module 50 receives the operating frequency detection signal S8. The processing module 50 outputs a wall control signal S9 according to the operating frequency detection signal S8. The driving module 60 receives the wall control signal S9. The driving module 60 controls the brushless DC motor 10 to start, stop, change the rotational speed and change the rotational direction according to the wall control signal S9.

The forward/reverse switching switch 90 is electrically connected to the processing module 50. The forward/reverse switching switch 90 outputs a forward/reverse switching signal S10. The processing module 50 receives the forward/reverse switching signal S10. The processing module 50 outputs a forward/reverse switching control signal S11 according to the forward/reverse switching signal S10. The driving module 60 receives the forward/reverse switching control signal S11. The driving module 60 controls the brushless DC motor 10 to change the rotational direction according to the forward/reverse switching control signal S11.

Please refer to FIG. 2. The first switch 20 transmits the first switch signal S1 to the operating electric potential detection unit 32 for detection when it is operated or not operated. The operating electric potential detection unit 32 receives the first switch signal S1 and detects the operating electric potential V2 of the first switch signal S1, and then outputs the operating electric potential detection signal S3 to the timer 40. The timer 40 receives the operating electric potential detection signal S3 and calculates the duration of the operating electric potential V2 each time, and outputs the operating electric potential timing signal S4 to the processing module 50. The processing module 50 receives the operating electric potential timing signal S4 and outputs the first control signal S5 to the driving module 60 according to the calculation result of the duration of the operating electric potential V2 and the first operating electric potential duration interval 51 each time. The processing module 50 outputs the second control signal S6 to the driving module 60 according to the calculation result of the duration of the operating electric potential V2 and the second operating electric potential duration interval 52 each time. The driving module 60 controls the brushless DC motor 10 to start, stop and change the rotational speed according to the first control signal S5, and the driving module 60 controls the brushless DC motor 10 to change the rotational direction according to the second control signal S6. This further increases the convenience of use.

The duration of the first operating electric potential duration interval 51 is between 10 ms and 5 S. The processing module 50 outputs the first control signal S5 to the driving module 60 every time the duration of the operating electric potential V2 matches the first operating electric potential duration interval 51. The driving module 60 controls the brushless DC motor 10 to start, stop and change the rotational speed according to the first control signal S5. The duration of the second operating electric potential duration interval 52 is greater than 5 S. The processing module 50 outputs the second control signal S6 to the driving module 60 every time the duration of the operating electric potential V2 matches the second operating electric potential duration interval 52. The driving module 60 controls the brushless DC motor 10 to change the rotational direction according to the second control signal S6. This further increases the convenience of use.

The processing module 50 outputs the wall control signal S9 according to the operating frequency detection signal S8. The driving module 60 receives the wall control signal S9. The driving module 60 controls the brushless DC motor 10 to start, stop, change the rotational speed and change the rotational direction according to the wall control signal S9.

In addition, the processing module 50 outputs the forward/reverse switching control signal S11 according to the forward/reverse switching signal S10. The driving module 60 receives the forward/reverse switching control signal S11. The driving module 60 controls the brushless DC motor 10 to change the rotational direction according to the forward/reverse switching control signal S11.

What is claimed is:

1. A brushless DC motor control system for a ceiling fan, electrically connected to a brushless DC motor, the brushless DC motor control system comprising:
    a first switch, having a first switch signal, wherein when the first switch is not actuated, an electric potential of the first switch signal is a normal electric potential; when the first switch is actuated, the electric potential of the first switch signal is an operating electric potential;
    a detection module, including an operating electric potential detection unit, the operating electric potential detection unit being electrically connected to the first switch, the operating electric potential detection unit being configured to receive the first switch signal and detect the operating electric potential of the first switch signal to output an operating electric potential detection signal;
    a timer, electrically connected to the operating electric potential detection unit, the timer being configured to receive the operating electric potential detection signal and calculate a duration of the operating electric potential each time to output an operating electric potential timing signal;
    a processing module, electrically connected to the timer, the processing module being configured to receive the operating electric potential timing signal, the processing module being preset with a first operating electric potential duration interval and a second operating electric potential duration interval, the first operating electric potential duration interval and the second operating electric potential duration interval being not overlapped with each other, the processing module outputting a first control signal according to a calculation result of the duration of the operating electric potential and the first operating electric potential duration interval each time, the processing module outputting a second control signal according to a calculation result of the duration of the operating electric potential and the second operating electric potential duration interval each time;
    a driving module, electrically connected to the processing module and the brushless DC motor, the driving module being configured to receive the first control signal and the second control signal, the driving module controlling the brushless DC motor to change a rotational speed according to the first control signal, the driving module controlling the brushless DC motor to change a rotational direction according to the second control signal.

2. The brushless DC motor control system as claimed in claim 1, wherein the detection module further includes a normal electric potential detection unit, the normal electric potential detection unit is electrically connected to the first switch and the timer, the normal electric potential detection unit is configured to receive the first switch signal and detect the normal electric potential of the first switch signal to output a normal electric potential detection signal, and the timer receives the normal electric potential detection signal.

3. The brushless DC motor control system as claimed in claim 2, wherein the first switch is a pull switch, and the first switch signal is a digital signal.

4. The brushless DC motor control system as claimed in claim 3, further comprising a wall control switch and an operating electric potential counter, the wall control switch being electrically connected to an AC power source, the wall control switch outputting a wall control switch signal, the operating electric potential counter being electrically connected to the wall control switch and the processing module, the operating electric potential counter being configured to receive the wall control switch signal and count an operating frequency of the wall control switch to output an operating frequency detection signal, the processing module receiving the operating frequency detection signal, the processing module outputting a wall control signal according to the operating frequency detection signal, the driving module receiving the wall control signal, the driving module controlling the brushless DC motor to start, stop, change the rotational speed and change the rotational direction according to the wall control signal, the driving module being electrically connected to the wall control switch.

5. The brushless DC motor control system as claimed in claim 4, wherein a duration of the first operating electric potential duration interval is between 10 ms and 5 S, the processing module outputs the first control signal every time the duration of the operating electric potential matches the first operating electric potential duration interval, a duration of the second operating electric potential duration interval is greater than 5 S, the processing module outputs the second control signal every time the duration of the operating electric potential matches the second operating electric potential duration interval.

6. The brushless DC motor control system as claimed in claim 5, wherein the driving module controls the brushless DC motor to start, stop and change the rotational speed according to the first control signal.

7. The brushless DC motor control system as claimed in claim 6, further comprising a forward/reverse switching switch, the forward/reverse switching switch outputting a forward/reverse switching signal, the forward/reverse switching switch being electrically connected to the processing module, the processing module receiving the forward/reverse switching signal, the processing module outputting a forward/reverse switching control signal according to the forward/reverse switching signal, the driving module receiving the forward/reverse switching control signal, the driving module controlling the brushless DC motor to change the rotational direction according to the forward/reverse switching control signal.

8. The brushless DC motor control system as claimed in claim 1, wherein a duration of the first operating electric potential duration interval is between 10 ms and 5 S, the processing module outputs the first control signal every time the duration of the operating electric potential matches the first operating electric potential duration interval, a duration of the second operating electric potential duration interval is greater than 5 S, the processing module outputs the second control signal every time the duration of the operating electric potential matches the second operating electric potential duration interval.

9. The brushless DC motor control system as claimed in claim 8, wherein the driving module controls the brushless DC motor to start, stop and change the rotational speed according to the first control signal.

10. The brushless DC motor control system as claimed in claim 1, wherein the driving module controls the brushless DC motor to start, stop and change the rotational speed according to the first control signal, and the processing module is a microcontroller unit.

* * * * *